United States Patent [19]

Clayton et al.

[11] 3,882,038
[45] May 6, 1975

[54] CLEANER COMPOSITIONS

[75] Inventors: Eugene Thomas Clayton, Mt. Kisco; Ruth Elinor Johnston, Briarcliff Manor, both of N.Y.; James M. Rector, South Charleston, W. Va.

[73] Assignee: Union Carbide Corporation, New York, N.Y.

[22] Filed: June 7, 1968

[21] Appl. No.: 735,169

[52] U.S. Cl. .............. 252/164; 252/89; 252/106; 252/107; 252/111; 252/112; 252/114; 252/115; 252/118; 252/119; 252/122; 252/123; 252/139; 252/153; 252/154; 252/158; 252/162; 252/163; 252/170; 252/527; 252/532; 252/535; 252/539; 252/546; 252/547; 252/550; 252/551; 252/554; 252/555; 252/558
[51] Int. Cl. .................. C11d 1/72; C11d 3/44
[58] Field of Search ............ 252/89, 139, 161, 138, 252/152, 137, 106, 162, 153, 158, 170, 364; 260/64, 615

[56] References Cited
UNITED STATES PATENTS

| | | | |
|---|---|---|---|
| 2,088,085 | 7/1937 | Gross et al. | 252/6 |
| 2,542,385 | 2/1951 | Ayo et al. | 252/137 |
| 2,710,843 | 6/1955 | Stebleton | 252/158 |
| 2,813,129 | 11/1957 | Benoit | 260/615 |
| 2,951,043 | 8/1960 | Blank | 252/171 |
| 2,952,637 | 9/1960 | Bray | 252/118 |
| 3,031,409 | 3/1962 | Perlman et al. | 252/138 |
| 3,239,467 | 3/1966 | Lipinski | 252/144 |
| 3,296,147 | 1/1967 | Gatza | 252/153 |
| 3,342,740 | 9/1967 | Kazmierczak et al. | 252/153 |
| 3,360,476 | 12/1967 | Krusius | 252/107 |
| 3,410,805 | 11/1968 | Goldsmith et al. | 252/158 |
| 3,463,735 | 8/1969 | Stonebraker et al. | 252/137 |
| 3,485,919 | 12/1969 | Markgraf | 424/322 |
| 3,607,764 | 9/1971 | Crotty et al. | 252/139 |

FOREIGN PATENTS OR APPLICATIONS

| | | | |
|---|---|---|---|
| 714,521 | 7/1965 | Canada | 252/153 |
| 848,224 | 9/1960 | United Kingdom | 252/138 |

OTHER PUBLICATIONS

Berni, R. P., "All Purpose Household Cleaners," General Anilin and Film, Soap and Chem. Spec., May 1968, pp. 53, 54, 134, 136.
"Cellosolve and Carbitol Solvents," Union Carbide Chem. Co., New York, 1962, pp. 4, 5, 9, 16, 17, 36 and 37.
Bennett, H., The Chemical Formulary, Chem. Publishing Co., Inc., New York, 1951, p. 515.
Bennett, H., The Chem. Form., Chem. Pub. Co., Inc., New York, 1961, pp. 310–311.

Primary Examiner—P. E. Willis, Jr.
Attorney, Agent, or Firm—Robert C. Brown

[57] ABSTRACT

A relatively non-toxic cleaner formulation comprised of a surfactant, water and at least one solvent having the formula I. $RO(C_2H_4O)_uH$,
II. $R'O(C_3H_6O)_vH$,
III. $R''O(C_2H_4O)_w(C_3H_6O)_xR''$,
IV. $R'''O(C_2H_4O)_yR''''$ $(OC_2H_4)_y$ $OR'''$,
V. $R'''O(C_3H_6O)_zR''''$ $(OC_3H_6)_z$ $OR'''$, or
VI. $R'''O(C_2H_4O)_y(C_3H_6O)_z$ $R''''$ $(OC_3H_6)_z$ $(OC_2H_4)_y$ $OR'''$ wherein the variables are as defined hereinafter. The formulation may be made in a concentration for direct use or as a concentrate to be diluted with water before use. Additional ingredients, such as alkaline "builders," hydrotropes, germicides, alcohol, ammonia, etc., may also be present in the formulation.

5 Claims, No Drawings

CLEANER COMPOSITIONS

This invention is concerned with cleaners which contain solvents. More particularly, this invention is concerned with cleaners containing glycol-ether solvents.

The toxicity of solvents used in cleaners, especially of the household spray-on type, is of prime importance. One objection to the monobutylether of ethylene glycol heretofore used in such cleaners is its toxicity by skin penetration (LD 50 Rabbits = 0.56 ml/Kg). The formulator must therefore take precautions when handling this solvent; and for household applications, its use is limited to dilute concentrations.

The unique feature of this invention is the utilization of glycol-ethers described below, which have a relatively low degree of toxicity (in terms of skin penetration and eye injury) and which are extremely efficient as solvents for removing normally resistant soils, such as grease and hydrocarbon waxes. The glycol-ether solvents used in this invention have the following average formulas:

$$RO(C_2H_4O)_uH$$

I wherein R is an alkyl group containing from 5 to 8 carbon atoms, and $u$ has a value of from 1 to 6, preferably 1 to 3, with the proviso that $u$ has a value of from 1 to 4 when R contains 5 carbon atoms, and $u$ has a value of 3 to 6 when R contains from 6 to 8 carbon atoms;

$$R'O(C_3H_6O)_vH$$

II wherein R' is an alkyl group containing from 3 to 6 carbon atoms, and $v$ has a value of from 1 to 4, preferably 1 to 3, with the proviso that $v$ has a value of from 1 to 3 when R' contains from 3 to 5 carbon atoms, and $v$ has a value of from 2 to 4 when R' contains 6 carbon atoms;

$$R''O(C_2H_4O)_w(C_3H_6O)_xR''$$

III wherein one R'' is a hydrogen atom and the other R'' is an alkyl group containing from 3 to 8 carbon atoms, $w$ has a value of from 1 to 3, preferably 1 to 2, $x$ has a value of from 1 to 3, preferably 1 to 2, and the sum of $w$ and $x$ has a maximum value of 5, preferably a maximum value of 3;

$$R'''O(C_2H_4O)_yR''''(OC_2H_4)_{y'} OR'''$$

IV wherein each R''' is hydrogen or an alkyl group containing from 1 to 5 carbon atoms, R'''' is an alkylene group containing from 3 to 8 carbon atoms, the total number of carbon atoms in R''' and R'''' does not exceed 12, preferably it does not exceed 8, $y$ and $y'$ each have a value of from 0 to 4, preferably 0 to 2, and the sum of $y + y'$ has a value of from 1 to 5, preferably a value of from 1 to 2;

$$R'''O(C_3H_6O)_zR''''(OC_3H_6)_{z'} OR'''$$

V wherein each R''' is hydrogen or an alkyl group containing from 1 to 5 carbon atoms, R'''' is an alkylene group containing from 3 to 8 carbon atoms, the total number of carbon atoms in R''' and R'''' does not exceed 12, preferably it does not exceed 8, $z$ and $z'$ each have a value of 0 to 3, and the sum of $z$ and $z'$ has a value of from 1 to 6, preferably a value of from 1 to 3;

$$R'''O(C_2H_4O)_y(C_3H_6O)_{z''} R''''(OC_3H_6)_{z'''} (OC_2H_4)_{y'} OR'''$$

VI wherein each R''' is hydrogen or an alkyl group containing from 1 to 5 carbon atoms, R'''' is an alkylene group containing from 3 to 8 carbon atoms, the total number of carbon atoms in R''' and R'''' does not exceed 10, preferably it does not exceed 8, $y$ and $y'$ each have a value of from 0 to 2, with the proviso that at least one of $y$ and $y'$ has a value of at least one, $z''$ and $z'''$ each have a value of from 0 to 2, with the proviso that at least one of $z''$ and $z'''$ has a value of at least one, and the sum of $y$, $y'$, $z''$ and $z'''$ has a value of from 2 to 3.

Illustrative of R in Formula I above are the pentyl, hexyl, heptyl and octyl groups, and their isomers. Illustrative of R' in Formula II above the propyl, butyl, pentyl and hexyl groups, and their isomers. Illustrative of R'' in Formula III above are the groups indicated for R and R'. Illustrative of R''' in Formulas IV to VI above are the methyl, ethyl, propyl, butyl and pentyl groups, and their possible isomers. Illustrative of R'''' in Formulas IV to VI above are the following divalent groups: propylene, butylene, pentylene, hexylene, heptylene and octylene, and their isomers.

The following formulas exemplify some of the glycol-ether solvents used in the cleaners of this invention:

$C_5H_{11}O(C_2H_4O)H$ $C_5H_{11}O(C_2H_4O)_3H$ $C_6H_{13}O(C_2H_4O)_3H$ $C_8H_{17}O(C_2H_4O)_3H$ $C_3H_7O(C_3H_6O)H$ $C_3H_7O(C_3H_6O)_3H$ $C_4H_9O(C_3H_6O)_2H$ $C_5H_{11}O(C_3H_6O)_3H$ $C_6H_{13}O(C_3H_6O)_2H$ $C_6H_{13}O(C_3H_6O)_3H$ $HO(C_2H_4O)(C_3H_6O)C_3H_7$ $C_4H_9O(C_2H_4O)(C_3H_6O)H$ $C_4H_9O(C_2H_4O)(C_3H_6O)_2H$ $C_5H_{11}O(C_2H_4O)_2(C_3H_6O)H$ $HO(C_2H_4O)(C_3H_6O)_2C_6H_{13}$ $C_7H_{15}(C_2H_4O)_2(C_3H_6O)H$ $HO(C_2H_4O)(C_3H_6O)C_8H_{17}$ $C_8H_{17}(C_2H_4O)_2(C_3H_6O)H$ $C_2H_5O(C_2H_4O)C_3H_6(OC_2H_4)OC_3H_7$ $HO(C_2H_4O)C_3H_6(OC_2H_4)OH$ $C_2H_5O(C_2H_4O)C_4H_8OH$ $CH_3O(C_2H_4O)C_4H_8(OC_2H_4)OH$ $C_2H_5O(C_2H_4O)_2C_4H_8OH$ $C_3H_7OC_4H_8(OC_2H_4)_2OH$ $C_2H_5O(C_2H_4O)C_4H_8(OC_2H_4)OC_2H_5$ $C_2H_5O(C_2H_4O)C_5H_{10}(OC_2H_4)OH$ $CH_3O(C_2H_4O)C_6H_{12}(OC_2H_4)OCH_3$ $CH_3O(C_2H_4O)_2C_7H_{14}OH$ $HO(C_2H_4O)C_8H_{16}(OC_2H_4)OH$ $C_2H_5(C_3H_6O)C_3H_6(OC_3H_6)OC_3H_7$ $HO(C_3H_6O)C_3H_6(OC_3H_6)OH$ $C_2H_5O(C_3H_6O)C_4H_8OH$ $CH_3O(C_3H_6O)C_4H_8(OC_3H_6)OH$ $C_2H_5O(C_3H_6O)_2C_4H_8OH$ $C_3H_7OC_4H_8(OC_3H_6)_2OH$ $C_2H_5O(C_3H_6O)C_4H_8(OC_3H_6)OC_2H_5$ $C_2H_5O(C_3H_6O)C_5H_{10}(OC_3H_6)OH$ $CH_3O(C_3H_6O)C_6H_{12}(OC_3H_6)OCH_3$ $CH_3O(C_3H_6O)_2C_7H_{14}OH$ $HO(C_3H_6O)C_8H_{16}(OC_3H_6)OH$ $C_2H_5(C_3H_6O)_2C_3H_6(OC_3H_6)OC_3H_7$ $HO(C_3H_6O)C_3H_6(OC_3H_6)_2OH$ $HO(C_3H_6O)_3C_3H_6OH$ $C_2H_5O(C_3H_6O)_3C_4H_8OH$ $C_2H_5O(C_3H_6O)_2C_4H_8(OC_3H_6)OC_2H_5$ $CH_3O(C_3H_6O)C_6H_{12}(OC_3H_6)_2OCH_3$ $HO(C_3H_6O)_2C_8H_{16}(OC_3H_6)OH$ $HO(C_2H_4O)C_3H_6(OC_3H_6)OH$ $CH_3(C_2H_4O)C_3H_6(OC_3H_6)OH$ $HO(C_2H_4O)C_3H_6(OC_3H_6)OC_2H_5$ $HO(C_2H_4O)C_4H_8(OC_3H_6)OC_3H_7$ $CH_3O(C_2H_4O)_2C_4H_8(OC_3H_6)OCH_3$ $CH_3O(C_2H_4O)C_4H_8(OC_3H_6)_2OCH_3$ $C_2H_5O(C_2H_4O)C_5H_{10}(OC_3H_6)_2OH$ $HO(C_2H_4O)(C_3H_6O)C_3H_6OH$ $CH_3(C_2H_4O)(C_3H_6O)C_3H_6OH$ $HO(C_2H_4O)(C_3H_6O)C_4H_8OH$ $HO(C_2H_4O)(C_3H_6O)C_4H_8OC_3H_7$ $CH_3O(C_2H_4O)_2(C_3H_6O)C_4H_8OCH_3$ $CH_3O(C_2H_4O)(CC_3H_6O)C_4H_8OCH_3$ $C_2H_5O(C_2H_4O)(C_3H_6O)C_5H_{10}OH$ $HO(C_2H_4O)(C_3H_6O)C_3H_6(OC_2H_4)OC_3H_7$ $C_2H_5O(C_3H_6O)(C_2H_4O)C_4H_8(OC_3H_6)OC_2H_5$ $HO(C_3H_6O)(C_2H_4O)C_8H_{16}(OC_2H_4)OH$ $C_5H_{11}O(C_2H_4O)_4H$ $C_8H_{17}O(C_2H_4O)_6H$ $C_6H_{13}(C_3H_6O)_4H$ $HO(C_2H_4O)_2(C_3H_6O)_3C_3H_7$ $HO(C_2H_4O)_3(C_3H_6O)_2C_8H_{17}$ $C_3H_7O(C_2H_4O)_2C_6H_{12}(OC_2H_4)_3OC_3H_7$ $HO(C_2H_4O)_3(C_3H_6O)_2C_8H_{17}$ $C_3H_7O(C_2H_4O)_2C_6H_{12}(OC_2H_4)_3OC_3H_7$ $C_4H_9O(C_3H_6O)_3CH_2CH(OC_3H_6)_3OC_4H_9$ $C_2H_5O(C_3H_6O)(C_2H_4O)CH_2\underset{C_3H_7}{\overset{C_2H_5}{C}}H(OC_2H_4)OH$ The glycol-ether solvents used in this invention can be prepared by any of the known methods. For instance, the glycol-ethers of Formula I, II or III above can be made by respectively adding ethylene oxide, propylene oxide or both ethylene oxide and propylene oxide (as a mixture or sequentially) to a mono-ol in the presence of a basic or acidic catalyst until a product of the desired molecular weight is obtained. The diols of Formulas IV, V and VI above are made in the same way, but a diol is used in place of the mono-ol. The glycol mono-ethers of Formula IV, V and VI, i.e., those in which there is an alkoxy group at one end and a hydroxy group at the other end, can be made by using a diol-ester, i.e., a diol having one of its hydroxy groups esterified, as a reactant. After the addition of ethylene oxide, propylene oxide, or both ethylene and propylene oxide, as desired, the hydroxy end-group can be converted to an alkoxy group by reaction with an alkyl halide. Then the ester group can be hydrolyzed to a hydroxy group. After being appropriately dried, the product mono-ether can be reacted with an alkyl halide or can be further reacted with ether ethylene oxide, propylene oxide, or a mixture of ethylene oxide and propylene oxide. If desired, the resulting hydroxy end-group can be converted to an alkoxy group by reaction with an alkyl halide. An alternative method for the preparation of glycol mono-ethers of Formulas IV, V and VI is to react an alcohol or an alkyl ether of mono-, di-, or tri- ethylene (or propylene) glycol with a $C_4$ or longer carbon chain alkylene oxide. The product from this reaction can be further reacted with ethylene oxide and/or propylene oxide and/or endblocked with an alkoxy group as described above.

A criterion for the effectiveness of glycol-ether solvents for use in aqueous hard surface cleaners is their degree of solvency for hydrophobic soils, such as grease and wax, which are normally resistant to water-based detergent cleaners containing "builders." (A "builder" is a compound that imparts additional cleaning power to a cleaner formulation.) A very useful efficiency test has been devised, by which solvent-containing cleaners may be rated for "crayon removability." This test involves the use of white vinyl tile soiled with a crayon marking pencil. The glycol-ether solvents are formulated into a low solids liquid detergent typical of the type used for spray-on cleaners. The soiled tiles are scrubbed with a facial tissue dipped in the test solution. Ease of removability is rated in relation to a standard glycol-ether solvent-based test formulation and/or commercial spray cleaners. The glycol-ether based systems are rated from 0 (failure) to 5 (excellent). The rankings of certain cleaners of this invention containing the various glycol-ethers discussed herein are hereinafter summarized in Table II. It is evident from the data in Table II that in terms of performance, cleaners containing the butyl, amyl or hexyl ethers of mono-, di- or tri-propylene glycol, butoxy ethyl ether of propylene glycol, or the amyl ethers of mono-, di- or tri-ethylene glycol are preferred for hydrophobic soils.

The organic components of aqueous hard surface cleaners are characteristically salted out of solution by the inorganic phosphates, silicates and other builders. Consequently, a coupling agent, or hydrotrope, is required to maintain product homogeneity over a wide temperature range. Sodium xylene sulfonate is effective and is often used for this application. Although the addition of hydrotrope to the formulation increases the solids level and the raw material cost, it does not enhance the performance and is therefore not considered an "active." Consequently, it is practical to use the minimum amount of hydrotrope required for product stability. As a guide to the selection of the appropriate glycol-ether solvent for a given system, its relative solubility, or "formulatability," is of major significance. Illustrative glycol-ether solvents used in the cleaners of this invention have been evaluated in terms of relative solubility, and their minimum hydrotrope requirements in formulated spray-on cleaners are hereinafter listed in Table III. From the data in that table, it is indicated that for many purposes the amyl and hexyl ethers of mono-, di- and tri-propylene glycol may be too hydrophobic, i.e., insoluble in these systems, requiring excess levels of hydrotrope for product homogeneity. In terms of performance and ease of formulation, the preferred glycol-ether solvents of those discussed herein are the amyl ethers of di- and tri-ethylene glycol, the butoxy ethyl ether of propylene glycol, the propyl ether of propylene glycol, and the butyl ethers of mono-, di- and tri-propylene glycol. When a formulation having a pleasant aroma is required, the amyl ethers of di- and tri-ethylene glycol, and butyl ethers of di- and tri-propylene glycol are preferred.

In summary, the three main characteristics of concern in the selection of glycol-ether solvents for use in aqueous hard surface cleaners are toxicity, solvency and solubility. It is desirable to select a solvent with relatively low toxicological properties, excellent solvency for soils such as grease and wax which are normally resistant to built, water-based detergents, and with good solubility, or which is easily coupled into liquid detergents. Based on these guidelines, the glycol-ether solvents discussed herein find utility in a variety of industrial and household aqueous hard surface cleaners.

The cleaner systems of this invention hereinafter described in more detail are useful in many applications, particularly for cleaning hard surfaces such as bathroom tiles, floor tiles of all sorts, windows and other glass and glazed surfaces, ovens, white-wall tires, metals, plastics, wood and other surfaces. The cleaners of this invention, particularly of the spray-on all purpose type, are also useful for removing spots from fabrics, particularly those containing cotton. The solvents of this invention may also be incorporated in wax strippers and in institutional maintenance cleaners. The cleaner systems can be neutral, acidic or basic depending upon their intended application. For example, an acid system may be chosen as a stainless steel cleaner or to prepare metal for painting. The typical household spray-on all purpose cleaner, on the other hand, generally contains an alkaline builder.

The simplest cleaner composition of this invention contains one or more glycol-ether solvents of the type hereinbefore described, a surfactant and water. The glycol-ethol solvents are present in an amount of from about 1 to about 10 percent by weight, preferably from about 2 to about 5 percent by weight, based on the weight of the formulation. The surfactant, which can be of the nonionic, anionic or amphoteric type, as indicated hereinafter, is generally present in an amount of from about 0.01 to about 5.0 percent by weight based on the weight of the formulation. The surfactant is preferably present in an amount of from about 0.05 to about 2.0 weight percent, more preferably from about 0.05 to about 1.0 and most preferably from 0.05 to about 0.5 weight percent.

The surfactants which are used in the cleaners of this invention are of the nonionic, anionic and amphoteric types, which are well known to those skilled in the art. In certain instances, combinations of two, or even all three, of the types of surfactants may be desirable in the cleaners.

Illustrative nonionic surfactants are the ethylene oxide adducts of alkyl phenols, of long chain alcohols or of fatty acids; esters of fatty acids and hydrophilic alcohols, such as sorbitan monooleate; alkanolamides; and the like.

Illustrative anionic surfactants are the soaps, alkyl benzene sulfonates, olefin sulfonates, paraffin sulfonates, alcohol and alcohol ether sulfates, phosphate esters, and the like.

Illustrative amphoteric surfactants are those which have both acidic and basic groups in their structure, such as amino and carboxyl radicals or amino and sulfonic radicals, or amine oxides and the like.

Depending upon the intended field of use for the cleaner, other ingredients may also be incorporated in it, such as, builders (the presence of which, as mentioned above, may require the additional presence of a hydrotrope), alcohols, ammonia, alkali, germicides, perfumes, opacifiers, dyes, propellants, starch or other thickeners, inert ingredients, etc.

Illustrative of the builders which may be used are the inorganic phosphates such as potassium pyrophosphate, the inorganic silicates, such as sodium metasilicate, or organic salts, such as ethylenediamine tetra acetate, tetra sodium salt. A single builder or a combination of builders may be used. The builder, when used, is generally incorporated in the cleaner in an amount of up to about 5 percent by weight, preferably from about 1 to about 3 percent by weight, based on the weight of the cleaner formulation.

A hydrotrope is a coupling agent used to maintain product stability, or homogeneity, over a wide temperature range. Illustrative hydrotropes are sodium toluene sulfonate, sodium xylene sulfonate, sodium cumene sulfonate, sodium naphthaline sulfonate, isopropanol alkyl phosphate esters, and the like. A single hydrotrope or a combination of hydrotropes may be used. The amount used will generally be the minimum required to maintain the desired stability, or homogeneity, of the cleaner. Although more than the minimum can be used, there is obviously no practical or economic advantage in doing so.

The presence of relatively volatile alcohols is desirable in formulations for certain uses, such as window cleaners, where a quick-drying formula cleaner is required. A single alcohol or a combination of alcohols may be used to obtain the desired volatility. When used, the alcohols are present in an amount of from about 2 to about 15 percent by weight, preferably about 3 to about 10 percent by weight, based on the weight of the cleaner formulation. Ethanol and the propanols are preferred.

Ammonia is another optional ingredient whose presence is desirable in formulations designed for specific uses, such as window cleaners. It may be used in an amount up to about 0.5 percent by weight, preferably about 0.1 to about 0.3 percent by weight, based on the weight of the cleaner formulation.

The use of alkali is desirable in cleaner formulations designed for removing grease, especially baked-on grease present on surfaces of ovens and pots and pans. The alkalis generally used are potassium or sodium hydroxide, carbonate or bicarbonate, or the soluble o- or m-silicates of the alkali metals. A single alkali or a combination of alkalis may be used. When used, the alkali is present in an amount of from about 2 to about 10 percent by weight, preferably about 3 to about 5 percent by weight, based on the weight of the cleaner formulation. It has been found that oven cleaners of this invention require less alkali than is present in commercial oven cleaners to be equally effective in removing baked-on grease.

The presence of a germicide in the cleaner is desirable when the cleaner is intended for certain applications, such as cleaning bathroom tiles. Illustrative germicides are the phenolics, such as o-phenylphenol, 4-chloro-2-cyclopentyl phenol, o-benzyl-p-chlorophenol, and the like; salicylanilides, such as 3,5,-4'-tribromosalicylanilide, 5,4'-dibromosalicylanilide, and the like; carbanilides, such as 3,4,4'-trichlorocarbanilide, 4,4'-dichloro-3-(trifluoromethyl)carbanilide, and the like; quaternary ammonium compounds, such as alkyl dimethyl benzyl ammonium chloride, and the like; iodine sanitizers, and the like. A single germicide or a combination of germicides may be used. The germicide is generally present in an amount of from about 0.01 to about 0.5 percent by weight, preferably about 0.1 to about 0.3 percent by weight, based on the weight of cleaner formulation.

Perfumes, opacifiers and dyes of the types known in the art may be present in the cleaners of this invention in amounts also known in the art.

The method of applying the cleaners of this invention to the article to be cleaned is not critical. Generally, the cleaners can be poured, wiped, sponged, brushed, or sprayed on the surface to be cleaned. The cleaner can also be used as a bath in which the article to be cleaned is dipped. However, the composition of the surface of the article to be cleaned (e.g., whether smooth or rough) and the position of the surfaces of the article when being cleaned (e.g., vertical or horizontal) will sometimes make one or more of these methods preferred.

When the cleaner is to be sprayed, the means for spraying can be a pump, such as the familiar finger pump on household all-purpose cleaners, or it can be propellant in an aerosol container in which the cleaner is sealed. The propellants which can be used are those known in the art, e.g., isobutane, nitrogen, nitrous oxide, the fluorocarbons, and the like. The propellant is present in an amount used in the art, generally about 5 to about 10 percent by weight, preferably about 5 to about 8 percent by weight based on the weight of the formulation.

For certain applications, such as cleaning ovens, when it is desired to brush or wipe on a claner and having it remain on a vertical surface and also to prevent excess evaporation of the solvent in the cleaner, a thickener may be incorporated in the cleaner. The thickener to be used is not critical. The only criteria to be observed in choosing a thickener is that it be compatible with the cleaner formulation. The thickeners generally used are starch, polyacrylic acid, maleic anhydride-vinyl methyl ether copolymers, and the like. A single thickener or a combination of thickeners may be used. The thickener is generally used in an amount of from about 0.1 to about 10 percent by weight, preferably from about 0.5 to about 7 percent by weight, based on the weight of the cleaner formulation. Generally, more starch is necessary to achieve the desired degree of thickening than is required when the thickener is polyacrylic acid, maleic anhydride-vinyl methyl ether copolymers, and the like.

Typical cleaner formulations of this invention containing glycol-ethers described above are:

Bathroom Tile Cleaners

| Ingredients | Per Cent by Weight Range | Preferred |
|---|---|---|
| Surfactant | 0.01 – 1.0 | 0.05 – 0.5 |
| Glycol-ether Solvent | 1 – 10 | 2 – 5 |
| Germicide | 0 – 0.5 | 0.1 – 0.3 |
| Water | remainder | remainder |

Window Cleaner

| Ingredients | Per Cent by Weight Range | Preferred |
|---|---|---|
| Surfactant | 0.01 – 0.1 | 0.05 – 0.1 |
| Glycol-ether Solvent | 1 – 10 | 2 – 5 |
| Alcohol | 2 – 15 | 3 – 10 |
| Ammonia | 0 – 0.5 | 0.1 – 0.3 |
| Water | remainder | remainder |

Spray-on All Purpose Cleaner

| Ingredients | Per Cent by Weight Range | Preferred |
|---|---|---|
| Surfactant | 0.5 – 5 | 0.5 – 2.0 |
| Alkaline Builder | 0 – 5 | 1 – 3 |
| Glycol-ether Solvent | 2 – 8 | 2 – 5 |
| Hydrotrope | as required | as required |
| Water | remainder | remainder |

Brush-on Oven Cleaner

| Ingredients | Per Cent by Weight Range | Preferred |
|---|---|---|
| Surfactant | 0.1 – 5 | 0.5 – 1 |
| Glycol-ether Solvent | 2 – 8 | 2 – 5 |
| Alkali | 2 – 10 | 3 – 5 |
| Hydrotrope | as required | as required |
| Thickener | 0.5 – 10 | 0.5 – 7 |
| Water | remainder | remainder |

Spray-on Oven Cleaner

| Ingredients | Per Cent by Weight Range | Preferred |
|---|---|---|
| Surfactant | 0.1 – 5 | 0.5 – 1 |
| Glycol-ether Solvent | 2 – 8 | 2 – 5 |
| Alkali | 2 – 10 | 3 – 5 |
| Hydrotrope | as required | as required |
| Propellant | 5 – 10 | 5 – 8 |
| Water | remainder | remainder |

Because of the relatively low toxicity of the cleaners of this invention, as compared to cleaners containing the solvents heretofore used, the cleaners of this invention can generally be prepared as concentrates, with attendant economy of packaging and transportation. The concentrates can be diluted with additional water before use. The concentrates can contain up to about 5 times the amounts of the ingredients present in the normal formulations, as illustrated above, which are generally used without dilution. An example of a concentrate formulation is the following:

Spray-on All Purpose Cleaner
Concentrate (Dilute 1:5 for use as spray-on cleaner)

| Ingredients | Per Cent by Weight Range | Preferred |
|---|---|---|
| Surfactant | 2.5 – 25 | 5 – 10 |
| Alkaline Builder | 2 – 25 | 5 – 15 |
| Glycol-ether Solvent | 10 – 40 | 10 – 25 |
| Hydrotrope | as required | as required |
| Water | remainder | remainder |

Generally, homogeneity is desirable in a concentrate, and therefore amounts which can be used in a particular formulation will be dictated by this factor.

In Table I, which follows, are given toxicological properties of some glycol-ether solvents.

It can be seen from a comparison of the data in Tables I and II that (1) although ethylene glycol monobutylether imparts good cleaning power to the cleaner, it is quite toxic; (2) ethylene glycol monoethylether imparts no cleaning power to the formulation in this test

TABLE I

TOXICOLOGICAL PROPERTIES OF GLYCOL-ETHER SOLVENTS*

| Solvent | Single Oral LD50/Rats, g/kg | Single Skin Penetration LD50/Rabbits, ml/kg | Single Inhalation Concentrated Vapors | Primary Skin Irritation, Rabbits | Eye Injury, Rabbits |
|---|---|---|---|---|---|
| ethylene glycol monoethylether | 3.00 | 3.5 | 4 hrs killed 1 of 6<br>8 hrs. killed 4 of 6 | trace | minor |
| ethylene glycol monobutylether | 1.48 | 0.56 | 8 hrs killed 1 of 6 | trace | minor |
| diethylene glycol monobutylether | 6.56 | 4.12 | 8 hrs killed none of 6 | none | moderate |
| propylene glycol monopropylether | 3.25 ml/kg | 4.00 | 8 hrs killed none of 5 | trace | moderate |
| propylene glycol monobutylether | 2.83 ml/kg | 3.56 | 8 hrs killed none of 6 | minor | moderate |
| propylene glycol monobutoxyethyl-ether (1-butoxyethoxy-2-propanol) | 5.66 ml/kg | 3.00 | 8 hrs killed none of 5 | minor | moderate |

The first three solvents in the above table have been proposed for use in cleaner formulations, and the second three are illustrative of the solvents used in the cleaner formulations of this invention.

In Table II, which follows, are given comparative data from the efficiency test described above, in which a white vinyl tile soiled with a crayon marking pencil was cleaned with a cleaner formulataion of the composition indicated below.

and is relatively toxic; and (3) although diethylene glycol monobutylether is relatively non-toxic, it imparts mediocre cleaning power.

In Table III, which follows, the amount of sodium xylene sulfonate (% 5 × 5) required to impart homogeneity to the cleaner composition at room temperature is given for a composition containing an anionic or a nonionic surfactant. The cloud point is that temperature to which the homogeneous composition must be heated before a non-homogeneous composition is obtained.

TABLE II

EVALUATION OF SOLVENTS FOR CRAYON REMOVAL IN A BUILT FORMULATION*

| SOLVENT | CRAYON REMOVABILITY** | |
|---|---|---|
| | 3% Solvent | 5% Solvent |
| ethylene glycol monoethylether | 0 | 0 |
| ethylene glycol monobutylether | 4⁻ | 4 |
| diethylene glycol monobutylether | 2 | 2 |
| propylene glycol monopropylether | 3 | 4⁻ |
| propylene glycol monobutylether | 5 | 5⁺ |
| propylene glycol monobutoxyethylether (1-butoxyethoxy-2-propanol) | 4⁻ | 4 |
| ethylene glycol monoamylether | 5 | 5 |
| diethylene glycol monoamylether | 4⁻ | 4 |
| triethylene glycol monoamylether | 3⁺ | 4 |
| propylene glycol monoamylether | 5 | 5⁺ |
| propylene glycol monohexylether | 5 | 5⁺ |
| propylene glycol mono-4-methyl-2-pentylether | 5 | 5 |
| dipropylene glycol monobutylether | 4⁺ | 5⁺ |
| dipropylene glycol monoamylether | 5 | 5⁺ |
| dipropylene glycol monohexylether | 5 | 5⁺ |
| dipropylene glycol mono-4-methyl-2-pentylether | 5 | 5⁺ |
| tripropylene glycol monobutylether | 4⁺ | 5 |
| tripropylene glycol monoamylether | 5 | 5⁺ |
| tirpropylene glycol monohexylether | 5 | 5⁺ |

*Formulation

| Ingredients | Per Cent by Weight Actives |
|---|---|
| Polyethoxylated linear alcohol, Tergitol Nonionic 15-S-9, a product of Union Carbide Corp., the Discovery Company | 1.0 |
| Tetrapotassium pyrophosphate(builder) | 2.5 |
| Solvent | 3.0, 5.0 |
| Sodium Xylene Sulfonate(hydrocrope) | as required |
| Water | balance |

**0 = Failure, 5 = Excellent

TABLE III

EVALUATION OF SOLVENTS FOR SOLUBILITY IN A BUILT FORMULATION*

| | TERGITOL NONIONIC 15-S-9 | | | | LINEAR ALKYLBENZENE SULFONATE | | | |
|---|---|---|---|---|---|---|---|---|
| | 3% SOLVENT | | 5% SOLVENT | | 3% SOLVENT | | 5% SOLVENT | |
| | | Cloud Point | | Cloud Point | | Cloud Point | | Cloud Point |
| SOLVENT | %SXS | °C | %SXS | °C | %SXS | °C | %SXS | °C |
| ethylene glycol monoethylether | 0 | 48 | 0 | 60 | — | — | — | — |
| ethylene glycol monobutylether | 0 | 50 | 0 | 45 | 0 | >100 | 0 | >100 |
| diethylene glycol monobutylether | 0 | 58 | 0 | 60 | 0 | >100 | 0 | >100 |

TABLE III – Continued

EVALUATION OF SOLVENTS FOR SOLUBILITY IN A BUILT FORMULATION*

| SOLVENT | TERGITOL NONIONIC 15-S-9 | | | | LINEAR ALKYLBENZENE SULFONATE | | | |
|---|---|---|---|---|---|---|---|---|
| | 3% SOLVENT | | 5% SOLVENT | | 3% SOLVENT | | 5% SOLVENT | |
| | %SXS | Cloud Point °C | %SXS | Cloud Point °C | %SXS | Cloud Point °C | %SXS | Cloud Point °C |
| propylene glycol monopropylether | 0 | 52 | 0 | 50 | — | — | — | — |
| propylene glycol monobutylether | 1 | 38 | 3 | 40 | 0 | >100 | 2 | 53 |
| propylene glycol monobutoxyethyl-ether (1-butoxyethoxy-2-propanol) | 0 | 42 | 1 | 42 | 0 | >100 | 0 | 56 |
| ethylene glycol monoamylether | 2 | 41 | 2 | 27 | 2 | >100 | 2 | 34 |
| diethylene glycol monoamylether | 0 | 41 | 1 | 47 | 0 | >100 | 1 | 46 |
| triethylene glycol monoamylether | 0 | 52 | 0 | 49 | 0 | >100 | 0 | 83 |
| propylene glycol monoamylether | 5 | 30 | 7 | 35 | — | — | — | — |
| propylene glycol monohexylether | 7 | 31 | 7 | 28 | — | — | — | — |
| propylene glycol mono-4-methyl-2-pentylether | 10 | 28 | 11 | 27 | — | — | — | — |
| dipropylene glycol monobutylether | 2 | 40 | 3 | 30 | 1 | 38 | 2 | 32 |
| dipropylene glycol monoamylether | 5 | 26 | 8 | 29 | — | — | — | — |
| dipropylene glycol monohexylether | 7 | 27 | 9 | 27 | — | — | — | — |
| dipropylene glycol mono-4-methyl-2-pentylether | 10 | 25 | 12 | 29 | — | — | — | — |
| tripropylene glycol monobutylether | 2 | 34 | 5 | 28 | 2 | 39 | 2 | 30 |
| tripropylene glycol monoamylether | 6 | 27 | 8 | 27 | — | — | — | — |
| tripropylene glycol monohexylether | 6 | 30 | 9 | 28 | — | — | — | — |

*FORMULATION:

| Ingredients | Per Cent by Weight Active |
|---|---|
| Surfactant | 1.0 |
| Tetrapotassium pyrophosphate (builder) | 2.5 |
| Solvent | 3.0, 5.0 |
| Sodium Xylene Sulfonate (hydrotrope) | as required |
| Water | balance |

What is claimed is:

1. A cleaner composition consisting essentially of from about 1 to about 10 percent by weight of a monobutyl or monoamyl ether of propylene glycol, dipropylene glycol or tripropylene glycol; from about 0.01 to about 5 percent by weight of polyethoxylated linear long chain alcohol surfactant and from about 98.99 to about 85 percent by weight water wherein all percents are based on the total weight of the cleaner composition.

2. A cleaner composition consisting essentially of from about 1 to about 10 percent by weight propylene glycol monobutyl ether from about 0.01 to about 5 percent by weight of polyethoxylated linear long chain alcohol surfactant and from about 98.99 to about 85 percent by weight of water, all percents being based on the totaal weight of the cleaner composition.

3. A cleaner composition consisting essentially of from about 1 to about 10 percent by weight propylene glycol monoamylether from about 0.01 to about 5 percent by weight of polyethoxylated linear long chain alcohol surfactant and from about 98.99 to about 85 percent by weight of water, all percents being based on the total weight of the cleaner composition.

4. A cleaner composition consisting essentially of from about 1 to about 10 percent by weight dipropylene glycol monobutyl ether from about 0.01 to about 5 percent by weight of polyethoxylated linear long chain alcohol surfactant and from about 98.99 to about 85 percent by weight of water, all percents being based on the total weight of the cleaner composition.

5. A cleaner composition consisting essentially of from about 1 to about 10 percent by weight tripropylene glycol monobutyl ether from about 0.01 to about 5 percent by weight of polyethoxylated linear long chain alcohol surfactant and from about 98.99 to about 85 percent by weight of water, all percents being based on the total weight of the cleaner composition.

* * * * *